J. JOUY.
KNEADING MACHINE.
APPLICATION FILED FEB. 18, 1910.
990,441.
Patented Apr. 25, 1911.
2 SHEETS—SHEET 1.
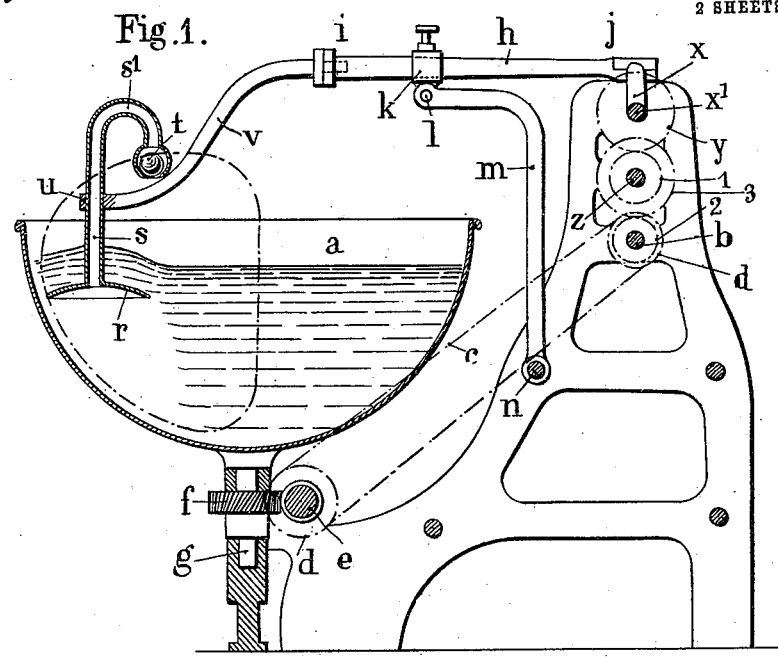
Fig. 1.
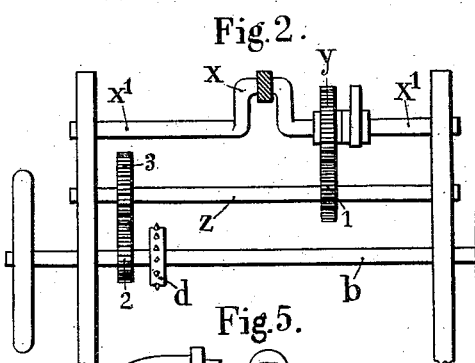
Fig. 2.
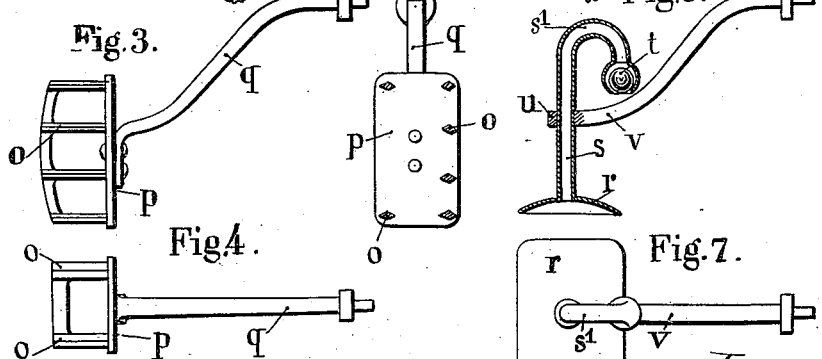
Fig. 3. Fig. 5. Fig. 6.
Fig. 4. Fig. 7.
Attest,
Bent. M. Stahl.
Edward N. Sarton.
Inventor
Jules Jouy
by Wm. Wallace White
Atty.

J. JOUY.
KNEADING MACHINE.
APPLICATION FILED FEB. 18, 1910.
990,441.
Patented Apr. 25, 1911.
2 SHEETS—SHEET 2.
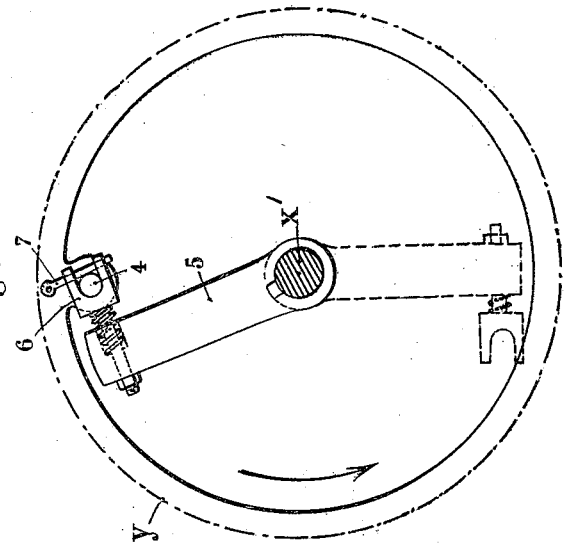
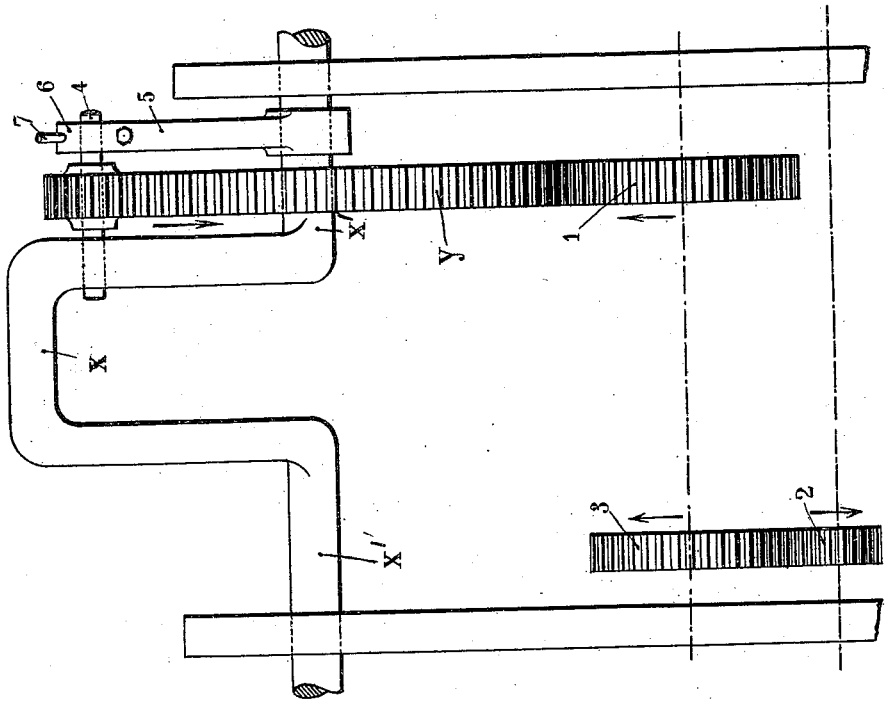
WITNESSES
INVENTOR

UNITED STATES PATENT OFFICE.

JULES JOUY, OF MOULIN DE LA GOËSSE, ÉPERNAY, FRANCE.

KNEADING-MACHINE.

990,441. Specification of Letters Patent. Patented Apr. 25, 1911.

Application filed February 18, 1910. Serial No. 544,676.

*To all whom it may concern:*

Be it known that I, JULES JOUY, of Moulin de la Goësse, Épernay, Marne, Republic of France, baker, have invented a Kneading-Machine, of which the following is a full, clear, and exact description.

The kneading of bread dough consists in intimately, partially and progressively mixing the various elements which constitute the dough (flour, water, yeast,) so as to obtain a homogeneous and flexible mass. The kneading is effected in two distinct operations: the first consists in mixing yeast, water and flour, the second comprises the aerating which is obtained by taking parts of dough in the bottom of the kneading-trough, raising the same above the mass, at the same time stretching them and letting them fall briskly, in such manner that these repeated movements imparted to the dough permit air to penetrate into the entire mass. During this operation, a part of the air is absorbed by the dough and the other part of the air produces swellings in the mass of dough.

The action of the air in the dough facilitates its treatment and gives the result of considerably increasing its volume.

The kneading-machines in use comprise troughs rotating on themselves and in which one or more kneading members are arranged. The shape of these members varies and said members are operated from the exterior of the trough, so as to plunge into this trough with different speeds by describing a circle more or less perfect, while the trough, by rotating, presents successively to the action of these kneading members all the parts of its contents. However, these kneading members do not give a dough similar to that obtained when worked by hand. This is by reason of the fact that the same members are employed to effect the kneading and the aerating operations without being suitable for these two operations which are so different from one another. In fact, the kneading member must be sharp so as to divide the dough as much as possible, while, on the contrary, all the parts of the aerating member must be flat with rounded edges for stretching and raising the dough without cutting the same. Moreover, the kneading members come down very rapidly, so as to imprison the air, for obtaining the aerating, but these rapid and continuous movements are prejudicial to the kneading and cause the throwing of flour outside the trough.

The aerating operation is in fact very delicate and when this work is done by hand, the baker must vary the raising of the dough according to the degree of consistency of the mass which changes at every instant during the kneading operation. This difficulty explains why none of the kneading machines raise a big ball of dough after each movement of the aerator, as this is effected during the work done by hand.

The present invention has for its object a kneading machine in which the kneading and blowing of the dough are divided so as to remedy the disadvantages indicated above.

In the accompanying drawings: Figure 1 is a vertical section of the improved kneading-machine. Fig. 2 shows detached the device for driving the members. Figs. 3, 4 and 5 illustrate respectively in side view, plan view and section the kneading member. Figs. 6 and 7 represent respectively in vertical section and plan view the aerating member. Fig. 8 is an enlarged detailed view of the disengaging mechanism, and Fig. 9 is a view of an end elevation of the upper portion of Fig. 8.

As illustrated in the drawings, this apparatus comprises a trough $a$ which is rotated with a slow and continuous movement by means of a driving mechanism comprising a shaft $b$, an endless chain $c$ engaging suitable wheels $d$, a worm $e$ and a worm gear $f$ rigidly mounted on the pivot $g$ of the trough. Above this trough is placed a lever $h$ having socket $i$, a power connection at $j$ and its fulcrum in a sleeve $k$ capable of rocking about an axis $l$ arranged at the end of a traverse rod $m$ also capable of rocking at $n$. The arm $i$, is arranged to receive, by means of any suitable coupling, either a kneading member or an aerating member.

The kneading member, Figs. 3, 4 and 5, is formed of horizontal cutting blades $o$ secured to a plate $p$. This plate is also provided with an arm $q$ which is secured to the socket $i$ of the lever $h$. The blades $o$ divide and mix the dough under the action of the rotation of the trough $a$ and of the upward and downward movement of the lever $h$, as will be described hereafter.

When the kneading operation has been effected, the kneading member is replaced by an aerating member. This aerating member, Figs. 6 and 7, is formed of a rectangular and slightly curved sheet-iron plate $r$ with rounded edges. The top of this plate is traversed by a tube $s$ secured to the plate in any suitable manner.

The upper part $s'$ of this tube is bent downwardly and provided with a ball or other flap valve $t$. The tube $s$ is also provided with a clamping collar $u$ having an extension $v$ connected to the socket $i$ of the lever $h$.

The upward movement of the lever $h$ is produced by the action of the crank X integral with a shaft $X'$ provided with a suitable disengaging device. As is shown, the disengaging device comprises a toothed wheel $y$ loosely mounted upon the shaft $X'$ and provided with a gudgeon 4. This wheel receives a regular and continuous movement through the medium of gear wheels 2, 3 and 1. On one side of the wheel $y$ is placed a tappet 5 secured to the shaft $X'$ and carrying at its upper end a spring abutment 6 with which the gudgeon 4 engages. During the kneading operation the tappet 5 and wheel $y$ are connected to one another by means of a pin 7 passing through the abutment 6, so that the kneading member is moved at uniform speed. During the aerating operation the pin 7 is removed. During the upward stroke of the aerating member the gudgeon 4 presses upon the abutment 6 and the crank X actuates the shaft $X'$ and the aerating member. During the downward stroke, however, the weight of the aerating member assisted by the weight of the dough which covers it actuates the shaft $X'$ and, consequently, the tappet 5, at a greater speed than the wheel $y$. Therefore, the tappet 5 and the crank X leave the gudgeon 4 and stop only when the aerating member encounters the surface of the dough. The wheel $y$ meanwhile continues its uniform movement and the gudgeon again comes into engagement with the crank X and the abutment 6, thereby causing the uniform rotation of the shaft $X'$.

The kneading member follows the dotted line traced in the trough $a$ (Fig. 1) by plunging downward at the middle of the trough and then moving upward along the wall of the latter. This member rises and moves downward at a uniform speed as the disengaging device does not operate during the kneading operation.

The aerating member follows the same line as the kneading member, but the downward movement is effected much more rapidly, as the disengaging device operates with this member, which permits the latter to move quicker than its driving device during its downward motion, being then actuated by its own weight and the weight of the dough adhering thereto; the greater the consistency of the dough the greater will be the amount of dough raised by the member and the quicker said member will fall back briskly upon the mass. At this moment, the driving mechanism operates again and causes this member to plunge into the dough, then this driving mechanism moves the said member upwardly along the wall of the trough; this upward motion determines the suction of the air through the flap-valve $t$ and under the convex part of the sheet-iron plate.

The speed with which the aerating member falls is, by reason of the disengaging device, so rapid that dough has not the time to separate from the member; consequently, the air has not been able to escape and the new plunging motion of the aerating member causes the formation of an enormous swelling at the surface of the dough which bursts only when it is encountered by the aerator. Thus the number of swellings produced in the trough corresponds exactly to the number of rotations effected by the aerating member, so that during the aerating operation, only swellings are seen on the surface of the dough. Moreover, this solid member with rounded edges stretches the dough considerably.

Claims:

1. In a kneading-machine, a rotary trough, a removable kneading-member, a removable aerating member, a lever receiving the kneading member and then the aerating member, a driving mechanism for the lever provided with a disengaging device operating during the aerating operation and immobilized during the kneading operation.

2. In a kneading-machine, a rotary trough, a removable kneading member comprising horizontal cutters, an aerating member comprising a convex sheet-iron plate surmounted by a central tube provided with an air inlet flap valve, a lever receiving the kneading member and then the aerating member, a driving mechanism for the lever provided with a disengaging device operating during the aerating operation and immobilized during the kneading operation.

The foregoing specification of my kneading-machine, signed by me this seventh day of February, 1910.

JULES JOUY.

Witnesses:
DEAN B. MASON,
R. EHIRIOT.